INVENTOR.
Richard D. Mathews

INVENTOR.
Richard D. Mathews

Dec. 8, 1970  R. D. MATHEWS  3,545,984
FOOD PROCESSING METHOD AND EQUIPMENT
Filed Oct. 11, 1968  4 Sheets-Sheet 4

INVENTOR.
Richard D. Mathews
BY Flehr, Hohbach, Test,
Albritton & Herbert
Attorneys

United States Patent Office 3,545,984
Patented Dec. 8, 1970

3,545,984
FOOD PROCESSING METHOD AND EQUIPMENT
Richard D. Mathews, Mountain View, Calif., assignor to Del Monte Corporation, San Francisco, Calif., a corporation of New York
Filed Oct. 11, 1968, Ser. No. 766,707
Int. Cl. A23l *3/04;* B65b *31/02*
U.S. Cl. 99—214
15 Claims

ABSTRACT OF THE DISCLOSURE

Food processing equipment and method making use of high temperature short time heat sterilization. Container filling and sealing operations take place within a pressurized chamber with the food at an elevated sterilizing temperature above 212° F. After a holding period to complete sterilization, the sealed containers are conveyed out of the chamber through a hydrostatic column with simultaneous cooling of the containers. Empty containers (e.g., cans) are conveyed into the chamber through a hydrostatic column. Some types of containers (e.g., flexible packages) can be brought into the chamber through air locks.

BACKGROUND OF THE INVENTION

High temperature, short time food processing as practiced with low acid foods employs sterilizing temperatures of the order of 250 to 260° F. for relatively short holding periods of the order of 30 seconds to three minutes. The container filling and sealing operations must be carried out in a pressurized space to prevent boiling or flashing of the water content. The pressurized space may be confined to the can filling and sealing equipment, or may be enlarged to accommodate equipment in addition to the filling and sealing equipment. The chamber may also accommodate working personnel for supervising, operating and maintaining the equipment. As previously constructed and used such pressurized chambers have been subject to a number of disadvantages. For example, the above ground location of the chambers has required that their walls be constructed to take internal pressures on the order of 20 p.s.i.g., which has resulted in excessive cost of construction. The mechanical air locks which have been used for moving empty containers into and sealed containers out of the pressurized chamber have been expensive to construct and maintain and have been subject to air leakage. One problem experienced with such air locks is that of container failure. This is because containers are filled and sealed at the sterilization temperature and chamber pressure. If cooled too much while within the chamber, the cans are collapsed due to the high chamber pressure. If the filled and sealed cans are removed to atmospheric pressure with cooling, they will burst due to the high internal pressure. In general this makes the equipment critical to operate and in addition it limits the method and equipment with respect to the size and type of container that can be used.

SUMMARY OF THE INVENTION

This invention relates generally to high temperature short time processing of various food materials and to methods and equipment for carrying out the same. More particularly, the present invention relates to methods and equipment of the type making use of a pressurized personnel chamber for carrying out certain operations, including container filling and sealing.

In general it is an object of the present invention to provide an improved method and equipment of the above character which will make possible high temperature, short time food processing without excessive capital expenditure for equipment.

Another object of the invention is to provide a method and apparatus of the above character which dispenses with use of mechanical air locks for moving containers into and sealed containers out of the pressurized container.

Another object of the invention is to provide a novel means and procedure for the cooling of the sealed containers, with such cooling being carried out in conjunction with transferring the sealed containers from the pressurized chamber to an upper working area.

Another object of the invention is to provide improved means and procedure for the movement of empty containers and sealed containers into and out of the chamber without air leakage.

In general the present invention employs a closed chamber forming a working space. An atmosphere for working personnel is maintained in the chamber at a pressure substantially above atmospheric. Container filling and sealing operations are carried out within this chamber. A food material at a sterilizing temperature above 212° F. is supplied to the container filling and sealing equipment from an upper level. The sealed containers are held for a sufficient period of time to ensure complete sterilization, after which they are transferred from the pressurized chamber to the upper level through a hydrostatic liquid column. This column forms a pressure seal and also serves to cool the sealed containers.

Additional objects and features of the invention will appear from the following description in which the preferred embodiment has been set forth in detail in conjunction with the accompanying drawing.

DETAILED DESCRIPTION

Figure 1:
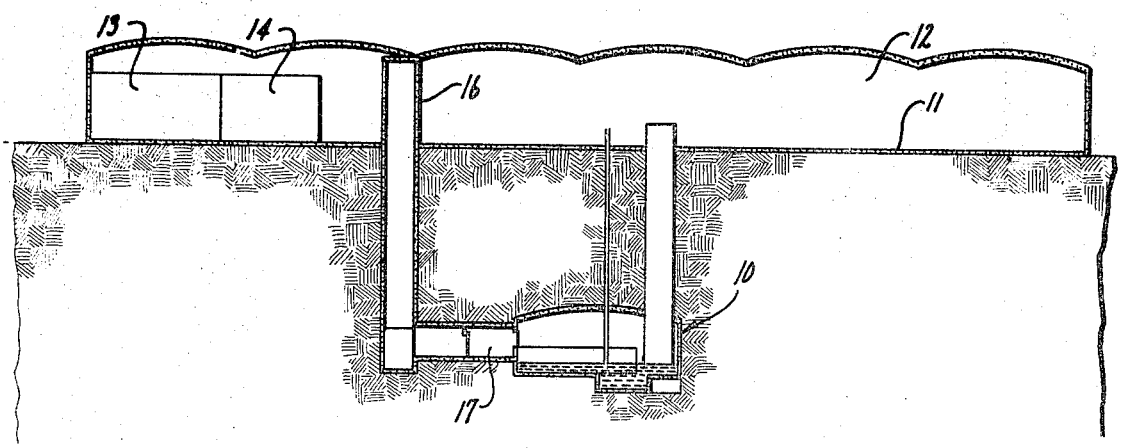
FIG. 1 schematically illustrates plant equipment for carrying out the invention, including a ground level factory, a subterranean pressure chamber, and an elevator and air lock for access to the chamber.

The present method can be best understood after a description of the equipment illustrated in FIGS. 1 to 4 inclusive of the drawing. FIG. 1 illustrates a chamber 10 located below the ground level 11. By way of example the chamber can be located at a depth of from 30 to 70 feet below the ground surface, depending upon the pressure which is to be maintained within the chamber. A factory 12 is located at the ground surface and is used for carrying out some preliminary processing operations, such as the storage of incoming food material, washing, cutting, mixing, and precooking. Freezing and cold storage facilities 13 and 14 are indicated.

An elevator 16 is indicated for transporting personnel to and from the chamber 10. Personnel must pass through the air lock 17 in entering and leaving the pressurized chamber 10.

Figure 4:
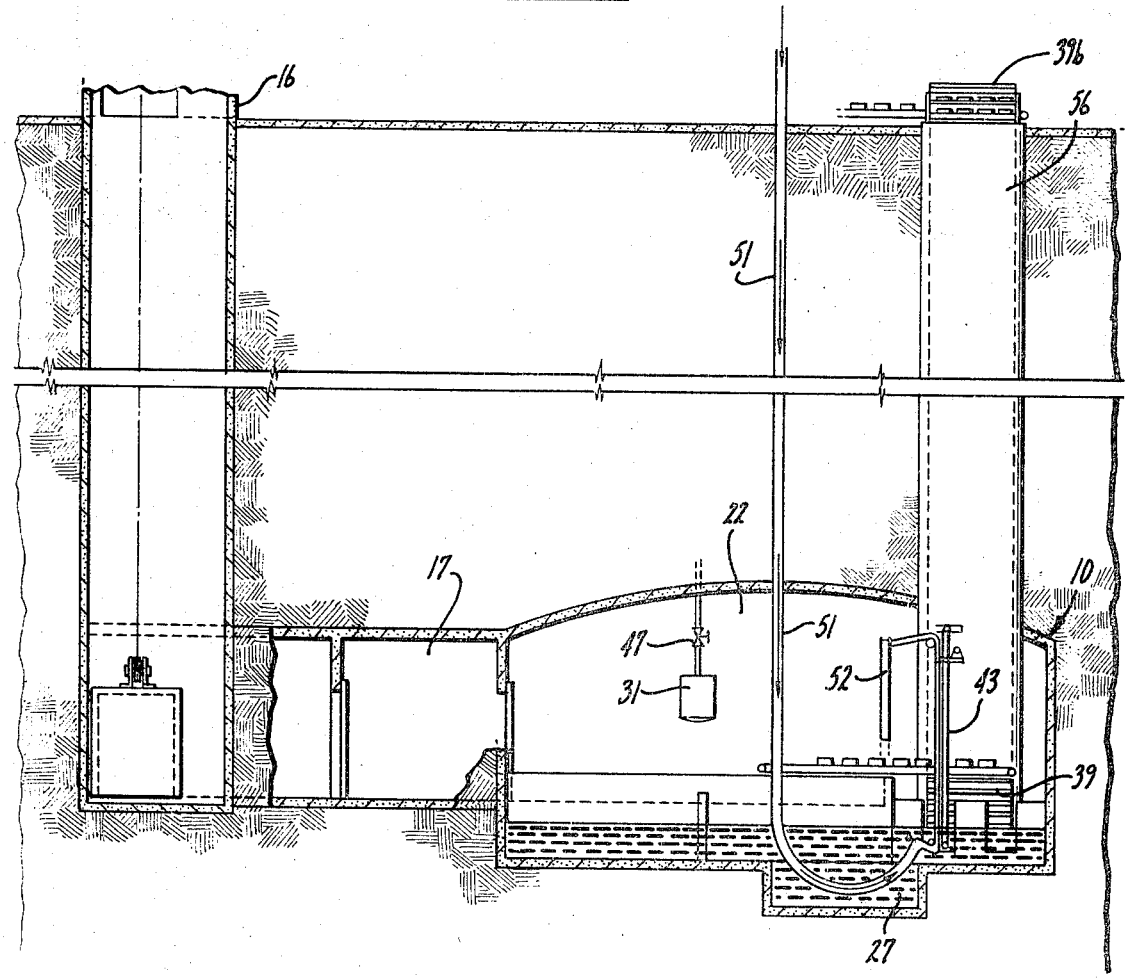
FIG. 4 is a cross-sectional view schematically illustrating means for conveying empty containers downwardly into the pressurized chamber, together with a hydrostatic column means through which filled the sealed containers are transferred.
Figure 2:
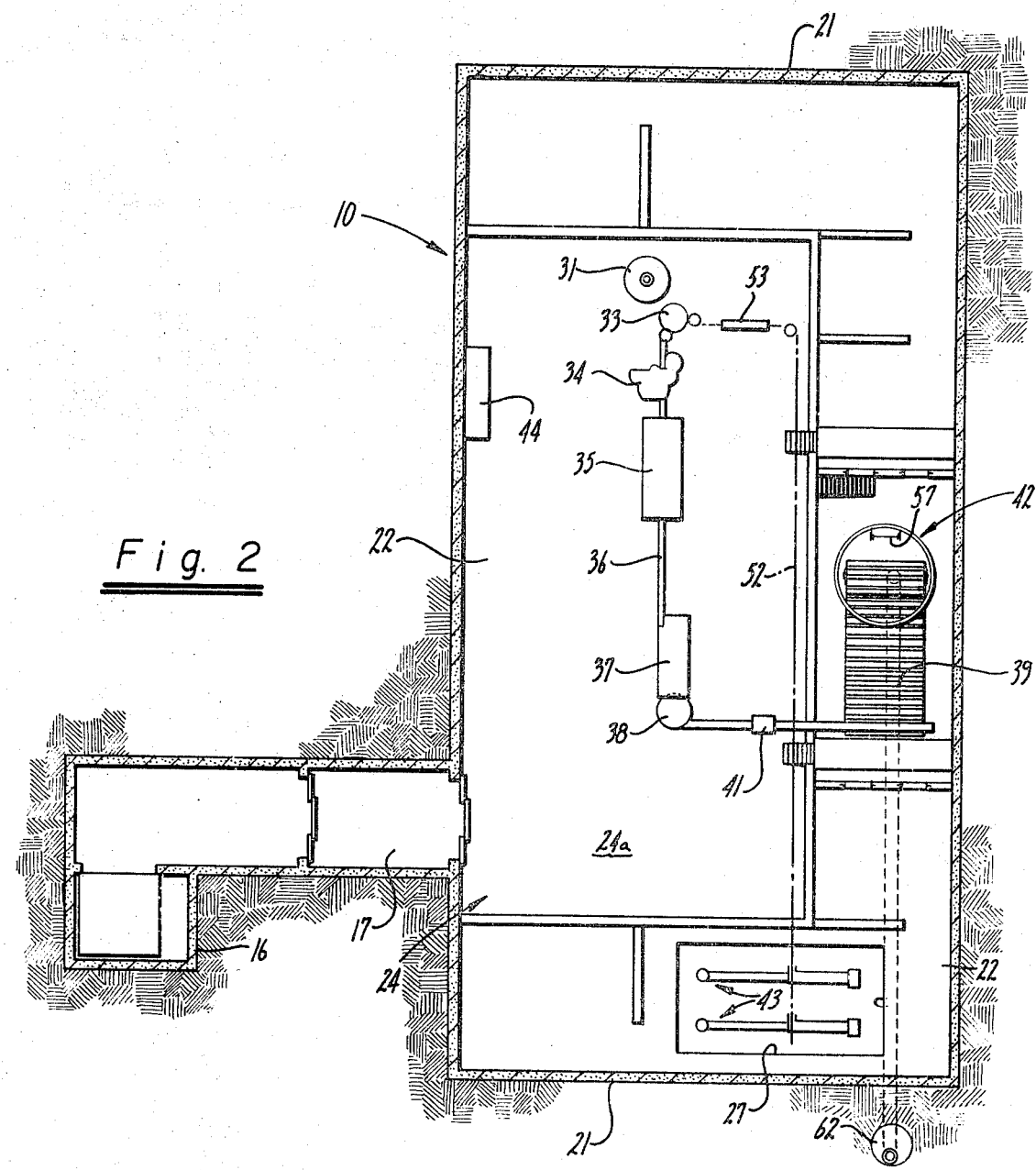
FIG. 2 is a floor plan of the pressure chamber on any large scale, schematically illustrating the location of certain of the more important equipment.
Figure 3:
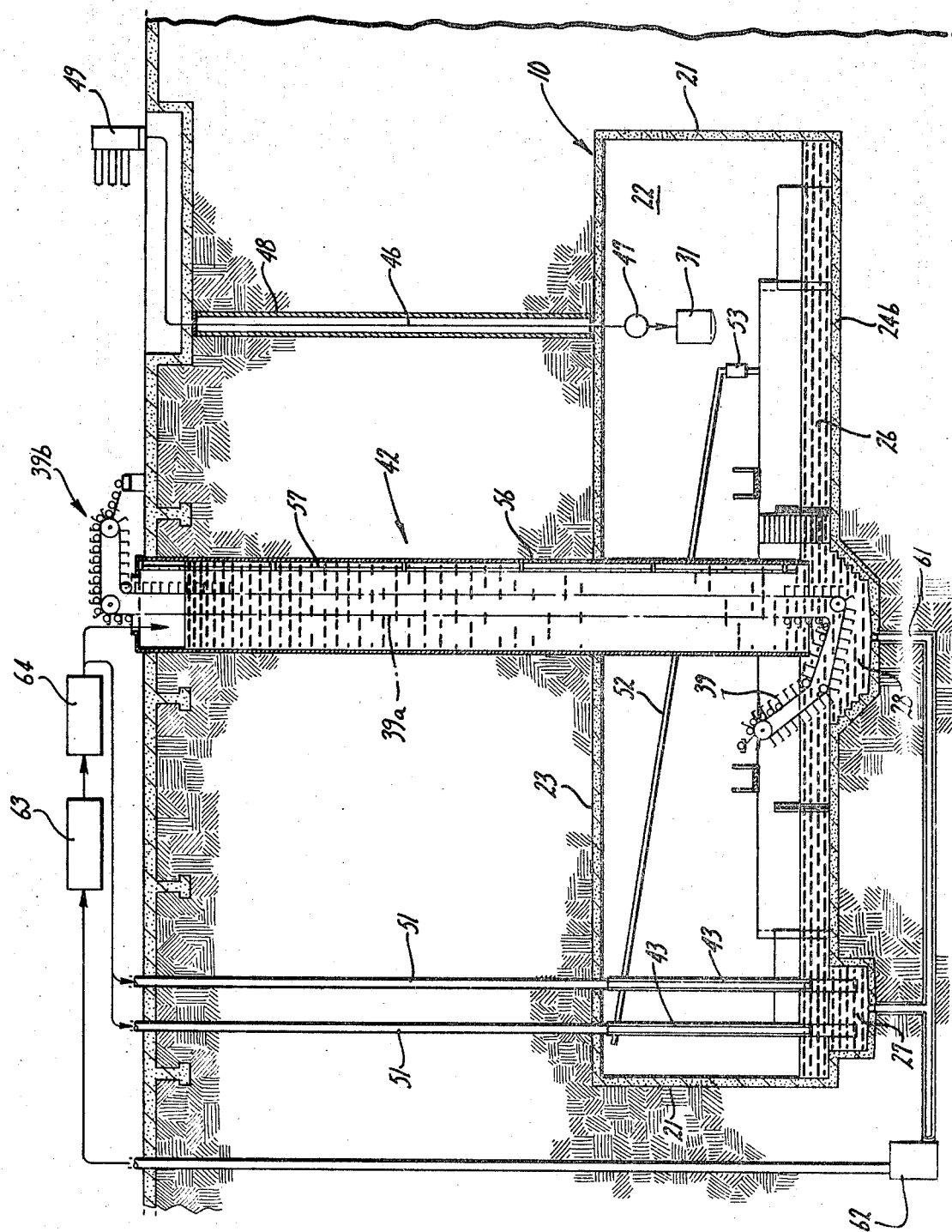
FIG. 3 is a sectional view taken along the line 3—3 of FIG. 2, and illustrating schematically conveying means extending between the pressurized chamber and ground surface, including hydrostatic column means.

FIGS. 2-4 illustrate one form of a pressurized chamber 10. In this instance it is indicated as being made of reinforced concrete. It includes the end walls 21, side walls 22, and top wall 23. The bottom wall 24 preferably is formed to provide the personnel floor 24a, together with a lower wall 24b which forms a part of a water reservoir 26. The lower wall 24b in turn is formed to provide the deeper liquid sumps 27 and 28. In the particular layout illustrated the reservoir 26 is in the form of a trough which extends across the right hand side wall of the chamber, and also along the end walls.

The layout of FIG. 2 also shows some of the processing equipment which may be installed in the pressurized chamber. This includes the surge tank 31 which receives the incoming food material, the container filler 33, and the container sealer 34, which when cans are employed is a seamer. The holding box 35 serves to receive the filled containers and hold them for a predetermined sterilizing period. The filled and sealed containers from the holding box 35 are moved by conveyer 36 to the accumulating table 37, and from the table the containers are moved by means such as the feed disc 38, to the conveyer 39. During transfer from feed disc 38 to conveyer 39, the containers may be acted upon by the up-ender 41. Means 42 which will be subsequently described in detail, serves to transfer the filled containers to the upper ground level, or in other words to the overlying plant.

Assuming that the containers being filled are cans or glass jars or similar receptacles, the elevators 43 indicated in FIG. 2 are provided for transferring these items from the overlying plant to the pressure chamber. Lids for the containers may be transported through the air lock 17.

The layout of FIG. 2 also indicates an air conditioner unit which is for the purpose of maintaining an atmosphere within the chamber compatible with personnel, and at a pressure substantially above atmospheric, as for example a pressure within the range of from 20 to 35 p.s.i.g. In general this pressure is selected to be of such value as to prevent flashing or boiling of the water content of food materials at the time they are introduced into the containers. The air conditioner is therefore provided with a pressure controlling means whereby it supplies an adequate flow of air into the chamber at the desired pressure while at the same time permitting controlled discharge of air from the chamber through a suitable bleed pipe (not shown). The gas may be atmospheric air without modification, or it may be a mixture of gases which can be breathed by personnel.

Since chamber 10 is pressurized, it will be evident that considerable force acts upon the walls of the chamber tending to deflect them outwardly. Such forces are not only resisted by the inherent strength of the walls comprising the chamber, but in addition, these walls preferably are reinforced by the burden surrounding the chamber. In a typical instance the ground formation where the pressure chamber is to be constructed is excavated through a side excavating tunnel, after which the walls are formed and sealed. However, as will be subsequently explained, the pressure chamber in some instances may be mounted above the ground surface.

A pipe 46 is shown for delivering food material from the ground surface to the pressurized chamber. Its discharge under the surge tank 31 may be controlled by the motor operated valve 47. Pipe 46 is insulated from the ground formation by conduit 48. The food material is preferably rapidly heated to a sterilizing temperature of the order of from 240 to 270° F., before it is discharged downwardly through the pipe 46. A heat exchanger 49 illustrated in FIG. 3 is for this purpose, and the food material after preliminary preparation, and preferably after pre-mixing, is pumped through the heat exchanger 49 and downwardly through pipe 46. The heat exchanger 49 is preferably of the type capable of rapidly heating the material to a sterilizing temperature, as for example an exchanger using direct contact of the material with steam, or one of the Votator type.

Each of the empty can elevators 43 is associated with one of the downwardly extending ducts or tubes 51. As shown in FIG. 4 each tube 51 has its lower end terminating in the sump 27 and contains a column of water extending substantially to the surface of the ground. It is assumed that each tube is dimensioned to take cans or like receptacles with their axes horizontal, and in single file. Each tube is equipped with endless conveying means including upwardly and downwardly traveling runs, with these runs being provided with flights or fingers or like means for engaging the successive cans and causing them to be moved downwardly at a predetermined rate through the tubes 51. The lower discharge ends of the tubes 51 are arranged to deliver the cans to the empty can elevators 43, whereby the cans are then delivered to the sloped gravity can conveyer 52, which delivers the cans to the sterilizer 53. Although sterilization of the cans before filling is deemed desirable, in some instances the cans may be only partially sterilized, or the sterilization operation may be omitted with reliance upon sterilization of the cans during the holding period after sealing. Preferably the sterilizer makes use of ultraviolet radiation or a like means which does not seriously affect the pressure or atmospheric conditions within the chamber 10. As indicated in FIG. 2, from the sterilizer the cans move to the filler 33.

Because a hydrostatic column of water is maintained in each of the tubes 51, these columns balance the pressure within the chamber 10, and likewise they form seals which permit movement of the cans into the pressure chamber without loss of air.

The means 42 for removing filled cans from the pressurized chamber is best shown in FIG. 3. It consists of a duct or shell 56 which may be cylindrical, and which extends downwardly from the ground surface through the top wall 23, with its lower end terminating within the sump 28. For convenience in making repairs the interior of this shell can be provided with ladders 57. The conveyer 39 previously mentioned has a portion 39a which extends upwardly through the shell 56, and above the ground surface it has a portion 39b which discharges the filled cans. This conveyer is indicated as being of the endless belt or chain type, with upwardly and downwardly moving runs within the shell 56. Also it is shown provided with fingers or flights which engage the cans and cause them to be lifted at a predetermined rate through the shell 56.

The shell 56 likewise contains water whereby a water column is formed which again balances against the pressure within the chamber 10. The column likewise forms a seal to prevent loss of air.

Operation of the equipment described above, and the steps of the present method, are as follows. A food material is prepared in the plant suitable for pumping through the heat exchanger 49. By way of example, this may be a material like macaroni or spaghetti together with cheese and tomato sauces, or a stew containing pieces of meat, gravy, and pieces of vegetable. Many other foods and food mixtures are likewise applicable. In general the food material should have some precooking and it should be pumpable and capable of rapid heating to a sterilizing temperature in the heat exchanger. A constant air pressure is maintained within the pressurized chamber 10, as for example a pressure within the range of from 20 to 34 p.s.i.g. Personnel enter and leave the pressurized chamber by way of the elevator 16 and the air lock 17. Assuming that the containers to be filled are conventional metal cans, they are conveyed downwardly through one or both of the tubes 51, in horizontal position, and immersed in the water within these tubes. After leaving the lower ends of the tubes 51, the can bodies are elevated out of the water by elevators 43, and delivered by the conveyer 52 to the can sterilizer 53. The water columns in tubes 51 are balanced with respect to the pressure within the chamber 10, and in addition these columns maintain a seal which is not broken by downward conveying of the cans. The can bodies pass from the sterilizer to the can fillers 33. Within the heat exchanger 49 the food material is heated to an elevated sterilizing temperature of the order of from 240 to 270° F. The particular temperature selected should be compatible with the food material being handled. The transit time of the food material within the heat exchanger 49 is relatively short, and may be of the order of 30 to 180 seconds. From the heat exchanger 49 the food material flows downwardly through the pipe 46 to the can fillers 31. Here again the transit time should be relatively short. During the can filling and sealing operations carried out by the seamer 34, the food material is exposed to atmosphere within the chamber 10. However, the pressure maintained is such as to prevent boiling or flashing of the water content. After the cans have been sealed, they are passed to the holding box 35 where they are held for a sufficient period of time to insure complete sterilization. This time may be of the order of 60 to 300 seconds, varying inversely with the temperature of the material. During this time no heat transfer occurs from the exterior to the interior of the cans, although some slight loss of heat occurs whereby at the end of the holding period the temperature of the can and contents may be slightly lower than immediately after the cans have been filled.

Immediately after leaving the holding box 35 the filled and sealed cans are transferred to the conveyor 39, which carries the cans downwardly into the sump 29, and then upwardly through the shell 56 to the surface of the ground. Commencing with immersion of the cans, and during transit through the water column maintained in shell 56, the cans and contents are gradually cooled by the water, and in addition the pressure applied to the sides of the cans is gradually reduced as the cans move upwardly to atmospheric. It is assumed that the temperature of the water within the sump 28, and within the shell 56, is such that when the cans reach the top of the water column they have cooled to such an extent that they will not burst from internal pressure. Thus by the time pressure on the cans has been reduced to atmospheric, the cans are no longer subject to internal pressure. The cans delivered by the conveyor portion 39b may progress through atmospheric coolers to effect a further reduction in temperature.

During operation of the equipment it is desirable to maintain the temperature of the water within the column 56 at some suitable level which will effect proper cooling of the cans as described above. For this purpose a water recirculating system is shown, consisting of a pipe connected to the sump 28, and extending to the ground surface. A pump 62 is interposed in this line and delivers the water through the cooler 63 and sterilizer 64, after which it is returned to the top of the shell 56. Similar recirculation can be provided for the water columns in the tubes 51.

It will be evident that the present equipment and method has a number of advantages over prior equipment and methods making use of pressurized chambers. As previously explained the design and construction of the pressurized chamber is greatly simplified. The manner in which the empty cans and the filled sealed cans are moved into and out of the pressure chamber dispenses with the use of mechanical pressure locks, and instead makes use of hydrostatic columns. Conventional equipment for cooling the filled sealed cans is eliminated, and cooling is carried out while the filled sealed cans are being conveyed out of the pressurized chamber. Because of the elimination of such mechanical air locks, the sealed containers are not subject to sudden pressure changes as they are removed from the chamber. Thus the equipment and method does not impose limitations on the size and type of containers that can be used to the extent experienced by prior practice. The cooling of the sealed containers in accordance with the present invention is carried out in an optimum manner because the external pressure upon the sealed containers is gradually reduced as the temperature is lowered and the internal can pressure reduced.

Although it is deemed advantageous to locate the pressurized chamber below the ground surface, it will be evident that certain novel features of the invention can be employed with the pressurized chamber above the ground. In such instance it is necessary to construct the pressurized chamber whereby its walls have sufficient strength to resist the internal pressure. Also it is necessary to extend the water columns to a level well above the level of the pressurized chamber to provide columns of sufficient height to balance against the chamber pressure.

In the foregoing description the heat exchanger 49 for rapidly heating the food material to a sterilizing temperature, has been described as located at ground level. However, in some instances it may be desirable to locate this heat exchanger directly within the pressurized chamber, in which event it is necessary to extend the steam pipes or other source of heat energy, downwardly into the pressurized chamber.

It has been assumed in the foregoing description that the containers are either metal cans or glass jars. However, in some instances it may be desirable to use so called flexible plastic containers, such as bags of laminated polyethelene. In such event the plastic material, in tube or web form, can be continuously fed downwardly through a water column, like one of the columns 51, or batches of such material can from time to time be moved through the personnel air lock 17. Bag sealing operations, and possible other bag forming operations, can be carried out within the pressurized chamber. It will be evident that the conveying means 39 can be readily modified to take such flexible containers. In instances where the container material is taken through the mechanical personnel air lock 17, the tubes 51 can be omitted.

Particular reference has been made to the sterilization of low acid foods, which require sterilizing temperatures well above 212° F. However, if desired, the same equipment and method can be used for the processing of high acid foods, with proper adjustment of the sterilizing temperatures and holding times.

Figure 5:
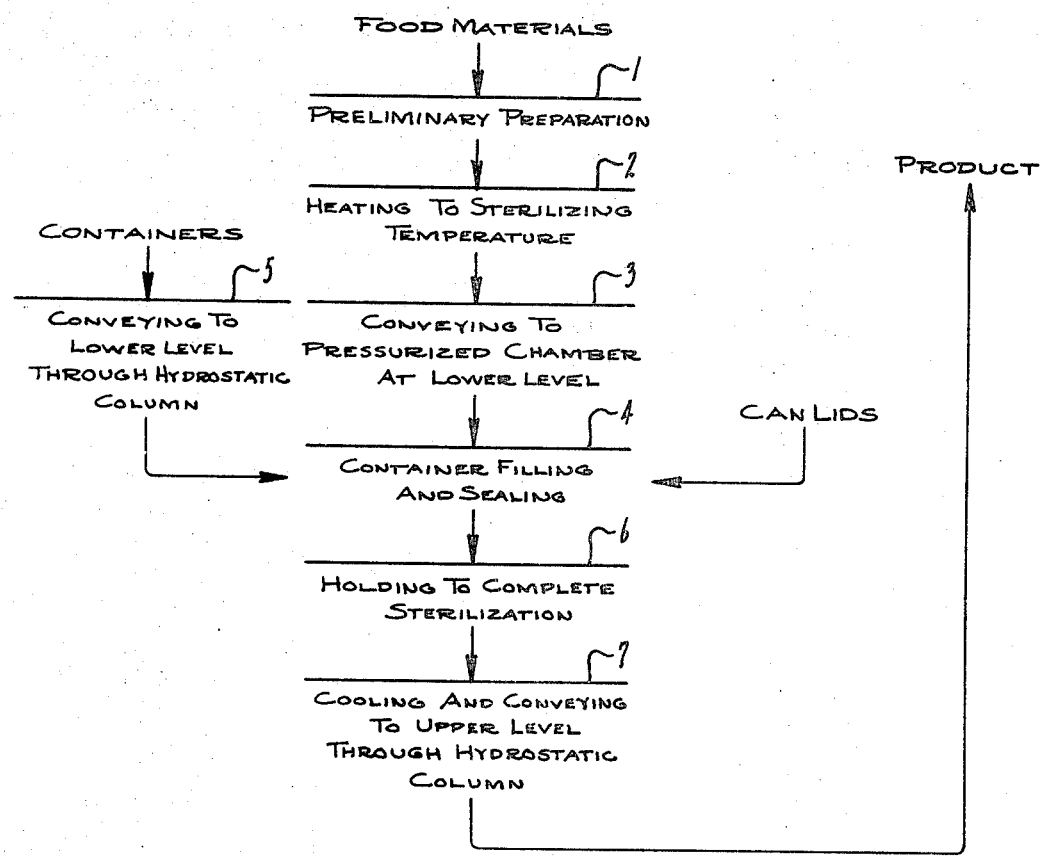
FIG. 5 is a flow diagram of the various steps of the method.

FIG. 5 illustrates steps of the method in flowsheet form. In step 1 the incoming food materials are subjected to the preliminary preparation operations, such as washing, cutting, mixing and blending, and generally some preliminary cooking. In step 2 the food material, which is in pumpable form, is rapidly heated to an elevated sterilizing temperature, such as a temperature of from 240 to 270° F. In step 3 the hot food material is caused to flow to the lower level and into the pressurized chamber. In the pressurized chamber the hot food material is supplied to the container filling and sealing machines (step 4) to fill the cans with the hot material and to immediately seal the cans without appreciable drop in temperature. The empty containers are supplied to step 4 by the conveying step 5, which conveys the empty containers to the pressurized chamber through a hydrostatic column. Also can lids are supplied to step 4. Immediately after container filling and sealing the sealed containers are subjected to the holding step 6, where they are held for periods of the order of from 60 to 300 seconds, to complete sterilization. The cans are then subjected to the cooling step 7, which is carried out in conjunction with the conveyance of the sealed containers from the pressurized chamber through the hydrostatic column.

A typical example of the method is as follows. A beef stew is prepared from meat stock, vegetables, and gravy forming ingredients. For example the meat stock can be cooked in boiling water, after which the cooked meat is diced, and the broth is concentrated. The vegetables can be prepared from raw vegetables which are washed, subjected to trimming and cutting operations, and blended with the diced beef and broth. Cereal flour is dispersed in water and likewise blended with the other ingredients. Other ingredients and seasonings can be added as desired. The resulting beef stew, which is of a pumpable consistency, is pumped through the heat exchanger 49 and rapidly heated to a temperature of the order of 260° F. The food material then flows through pipe 46 into surge tank 31, then into the container filler. The pressure maintained in the pressurized chamber is about 20 p.s.i.g. The floor of the pressurized chamber 10 is located about 70 feet from the ground surface, and the hydrostatic water columns maintained in tubes 51, and also in the shell 56, are about the same height. Because of the pressure maintained in chamber 10, the can filling and sealing operations are carried out without flashing or boiling of the water content of the material. Immediately after sealing the cans, the contents are at a temperature of about 260° F. The filled cans then are immediately transferred to the holding box 35, where they are held for a period of about 300 seconds to complete sterilization. The fluid cans are then transferred to the conveying means 39 which carries them down into the water in sump 28, and then upwardly at a predetermined constant rate, through the water column in shell 56. A heat transfer takes place between the contents of the cans and the water, whereby the average temperature of the contents of the cans falls to a level well below 260° F. before the can has reached the upper end of the shell 56. Simultaneously with such drop in temperature, the external pressure exerted upon the sides and ends of the cans is reduced to atmospheric. During the operations just described, the empty cans are being continuously conveyed through the water columns maintained by tubes 51, and both the water column in shell 56 and in tubes 51 maintain seals to prevent escape of air. Likewise during the example just described, the pump 62 can be in continuous operation to supply cooled water to the upper end of the shell 56 and tubes 51, thus maintaining the temperature of the water in shell 56 at a relatively constant value, for a given level. The cooling water is treated to minimize bacterial contamination.

The equipment and method of this invention makes possible the use of flexible containers, as well as cans, jars and other relatively rigid containers. This is because cooling and pressure reduction during movement through shell 56 can be controlled and coordinated to maintain a balanced container pressure (i.e., the internal pressure substantially the same as the external container pressure). Thus injury or bursting of bags or like flexible plastic containers, due to internal pressure substantially greater than the external pressure, during the conveying and cooling period, is avoided.

I claim:

1. In a food processing method making use of a pressurized working chamber accessible to working personnel, the steps of heating a prepared food material to a sterilizing temperature above 212° F., filling containers with the hot food material, sealing the containers, said filling and sealing steps being carried out within the working chamber, the pressure within the chamber being maintained at a value above atmospheric and sufficient to prevent boiling of the hot food material during said filling and sealing steps, maintaining a hydrostatic column of liquid extending upwardly from a lower region of the pressurized chamber to an upper level, the column being of such height as to balance against the pressure within the chamber, and conveying the sealed containers upwardly through said column from the lower region to the upper level with delivery of the containers exterior of the chamber.

2. A method as in claim 1 in which the column is maintained by cooling liquid serving to cool the containers during transit through the same and to effect gradual reduction of external pressure on the containers from the pressure value maintained in the chamber to atmospheric pressure at the upper level.

3. A method as in claim 1 in which the pressurized chamber is located below ground level and is surrounded by a burden whereby walls of the chamber are reinforced against the internal chamber pressure.

4. A method as in claim 1 in which the food material is heated to a sterilizing temperature at the upper level and exterior of the working chamber and is caused to flow as a hydrostatic column down to the lower level and into a lower region of the pressurized working chamber against the pressure therein.

5. A method as in claim 1 in which an additional hydrostatic column is maintained extending downwardly from the upper level and from the exterior of the working chamber to a lower region of the pressurized working chamber, and in which empty containers are conveyed through the additional column and into the pressurized working chamber.

6. In equipment for food processing, a closed working chamber forming a working space suitable for personnel occupancy, the chamber comprising walls defining a floor, sides and top, means for maintaining an atmosphere for working personnel in the chamber at a pressure above atmospheric, container filling and sealing equipment located within the chamber, and means for effecting transfer of containers between the chamber and an upper level, said means including a reservoir in a lower region of the pressurized chamber, duct means having its lower end terminating in the reservoir and its upper end at an upper level exterior of the chamber, the duct means and the reservoir containing liquid whereby the liquid in the duct means forms a hydrostatic column that balances against the pressure in the chamber, the dust means providing a passage for movement of containers between the pressurized chamber and the exterior by way of the reservoir and the liquid column in the duct means.

7. Equipment as in claim 6 in which conveying means extends through the reservoir and the duct means and serves to engage and move containers through the liquid column.

8. Equipment as in claim 6 in which the conveying means serves to move empty containers from the upper level through the liquid column in the duct means into the pressurized chamber.

9. Equipment as in claim 6 in which two duct means are provided together with two conveying means extending through the reservoir and the two duct means, one of the conveying means serving to move empty containers from the exterior through the corresponding duct means to the interior of the chamber and the other conveying means serving to move the filled and sealed containers from the chamber through the corresponding duct means to the exterior.

10. Equipment as in claim 6 in which conveying means serves to move filled and sealed containers from the pressurized chamber through the reservoir and duct means to the upper level and to the exterior of the chamber.

11. Equipment as in claim 10 in which the liquid of the column serves to cool the sealed containers during movement of the containers from the pressurized chamber to the upper level and to the exterior of the chamber.

12. In equipment for food processing, a closed chamber forming a working space suitable for personnel, the chamber being located below the ground surface, the chamber comprising walls defining a floor, sides and a top, the walls being externally reinforced by surrounding burden, means for maintaining an atmosphere for working personnel in the chamber at a pressure above atmospheric, filling and sealing equipment located within the chamber, duct means extending from the chamber to the upper ground level, means forming a liquid reservoir in the lower portion of the chamber, the lower end of the duct means terminating within said reservoir, a liquid within the reservoir and within the duct means forming a hydrostatic liquid column extending from the reservoir to the ground surface, said liquid column being balanced with respect to the pressure within the chamber, and conveying means extending through the duct means and serving to convey containers between the pressurized chamber and the ground surface, the liquid column within the duct means forming an air seal serving to prevent escape of air from the chamber.

13. Equipment as in claim 12 in which the conveying means serves to convey empty containers from the ground surface downwardly into the chamber.

14. Equipment as in claim 12 in which the conveying means serves to convey filled and sealed containers from the chamber upwardly to the ground surface.

15. Equipment as in claim 12 in which one conveying means serves to convey empty containers from the ground surface downwardly and into the chamber, and in which a separate conveying means serves to convey filled and sealed containers from the chamber upwardly to the ground surface.

References Cited

UNITED STATES PATENTS

| | | | |
|---|---|---|---|
| 1,584,397 | 5/1926 | Paxton | 99—214 |
| 2,541,113 | 2/1951 | Smith et al. | 99—214X |
| 2,639,991 | 5/1953 | Ball | 99—214X |
| 2,794,385 | 6/1957 | Inghram | 99—216UX |
| 3,255,690 | 6/1966 | Schack et al. | 99—249 |

FOREIGN PATENTS

| | | | |
|---|---|---|---|
| 608,528 | 9/1960 | Italy | 99—249 |

TIM R. MILES, Primary Examiner

U.S. Cl. X.R.

99—249